(12) United States Patent
Zhang

(10) Patent No.: US 10,698,514 B2
(45) Date of Patent: Jun. 30, 2020

(54) SENSOR ASSEMBLY AND TERMINAL

(71) Applicant: Guangdong Oppo Mobile Telecommunications Corp., Ltd., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 30 days.

(21) Appl. No.: 15/865,496

(22) Filed: Jan. 9, 2018

(65) Prior Publication Data

US 2018/0260060 A1 Sep. 13, 2018

(30) Foreign Application Priority Data

Mar. 7, 2017 (CN) .......................... 2017 1 0132063

(51) Int. Cl.
*G06F 1/16* (2006.01)
*G01S 7/493* (2006.01)
(Continued)

(52) U.S. Cl.
CPC ............ *G06F 3/0412* (2013.01); *G01S 17/08* (2013.01); *G01S 17/88* (2013.01); *G06F 1/1626* (2013.01);
(Continued)

(58) Field of Classification Search
CPC ......... G06F 1/00–1626; G06K 9/0012; H04M 1/72522; G01S 7/493; G01L 1/142
See application file for complete search history.

(56) References Cited

U.S. PATENT DOCUMENTS 5,177,802 A * 1/1993 Fujimoto ............. A61B 5/1172
382/124
2003/0235329 A1* 12/2003 Komatsuzaki ..... G06K 9/00026
382/124
(Continued)

FOREIGN PATENT DOCUMENTS

CN 102917091 A 2/2013
CN 104899585 A 9/2015
(Continued)

OTHER PUBLICATIONS

International search report issued in corresponding international application No. PCT/CN2017/117774 dated Mar. 21, 2018.
(Continued)

*Primary Examiner* — Lin Li
(74) *Attorney, Agent, or Firm* — Young Basile Hanlon & MacFarlane, P.C.

(57) ABSTRACT

A sensor assembly and a terminal having the sensor assembly are provided. The sensor assembly includes a fingerprint module and a proximity sensor. The fingerprint module includes a fingerprint panel and a fingerprint sensor located below the fingerprint panel. The proximity sensor is located below the fingerprint panel and includes a light emitter and a light receiver. Light emitted by the light emitter exits through the fingerprint panel, and is then reflected by an external object to form reflected light which is in turn received by the light receiver through the fingerprint panel.

18 Claims, 6 Drawing Sheets

(51) Int. Cl.

| | | |
|---|---|---|
| *G01L 1/14* | (2006.01) | |
| *G06T 1/00* | (2006.01) | |
| *A61B 5/11* | (2006.01) | |
| *G06K 9/00* | (2006.01) | |
| *G06F 1/00* | (2006.01) | |
| *H04M 1/72* | (2006.01) | |
| *G06F 3/041* | (2006.01) | |
| *H04M 1/02* | (2006.01) | |
| *G01S 17/08* | (2006.01) | |
| *G01S 17/88* | (2006.01) | |
| *H04M 1/725* | (2006.01) | |
| *G06F 3/042* | (2006.01) | |
| *G06F 21/32* | (2013.01) | |
| *G06F 3/044* | (2006.01) | |

(52) U.S. Cl.
CPC .......... *G06F 1/1637* (2013.01); *G06F 3/0421* (2013.01); *G06F 21/32* (2013.01); *G06K 9/0002* (2013.01); *H04M 1/026* (2013.01); *H04M 1/72569* (2013.01); *G06F 3/044* (2013.01); *G06F 3/0416* (2013.01); *H04M 1/72533* (2013.01); *H04M 2250/12* (2013.01)

(56) References Cited

U.S. PATENT DOCUMENTS

| | | | |
|---|---|---|---|
| 2004/0060989 A1 | 4/2004 | Bove | |
| 2006/0273417 A1* | 12/2006 | Ganapathi | G01L 1/142 257/415 |
| 2010/0053118 A1* | 3/2010 | Chen | G06F 1/1601 345/175 |
| 2011/0261191 A1 | 10/2011 | Byren et al. | |
| 2015/0187980 A1* | 7/2015 | Yamamoto | G06F 1/00 250/552 |
| 2015/0235370 A1 | 8/2015 | Abovitz et al. | |
| 2015/0309164 A1* | 10/2015 | Cho | G01S 7/493 250/216 |
| 2016/0004899 A1* | 1/2016 | Pi | G06F 1/1626 345/173 |
| 2017/0119307 A1* | 5/2017 | Shim | H04M 1/72522 |
| 2017/0124370 A1* | 5/2017 | He | G06K 9/0012 |
| 2017/0124376 A1* | 5/2017 | Wyrwas | G06K 9/00013 |
| 2018/0096186 A1* | 4/2018 | Mienko | G06K 9/0008 |

FOREIGN PATENT DOCUMENTS

| | | | | |
|---|---|---|---|---|
| CN | 205334502 U | | 6/2016 | |
| CN | 106385475 A | | 2/2017 | |
| CN | 106385511 A | | 2/2017 | |
| CN | 106444997 A | | 2/2017 | |
| CN | 106444998 A | | 2/2017 | |
| CN | 106453723 A | | 2/2017 | |
| CN | 106933415 A | | 7/2017 | |
| JP | 2005215992 A | * | 8/2005 | .............. G06T 1/00 |
| JP | 2005275496 A | | 10/2005 | |
| TW | 201546722 A | | 12/2015 | |
| TW | 201601009 A | | 1/2016 | |
| TW | I567657 B | | 1/2017 | |

OTHER PUBLICATIONS

Extended European search report issued in corresponding European application No. 17210674.2 dated Jul. 27, 2018.

* cited by examiner

SENSOR ASSEMBLY AND TERMINAL

CROSS-REFERENCE TO RELATED APPLICATION(S)

The present application claims priority to Chinese Patent Application No. 201710132063.6, filed on Mar. 7, 2017, the content of which is hereby incorporated by reference in its entirety.

TECHNICAL FIELD

The present disclosure relates to terminal technologies, and more particularly, to a sensor assembly and a terminal having the sensor assembly.

BACKGROUND

With the rapid development of mobile terminal technologies, mobile terminals become more and more popular and serve as essential equipment in people's lives. People can learn or be entertained with mobile terminals.

Currently, a mobile terminal typically has a touch display panel including a display area and a transparent non-display area. In order to improve the aesthetic appeal of the mobile terminal, generally, the lower surface of the non-display area is coated with ink which forms a plurality of layers so as to cover the internal structure of the mobile terminal.

Additionally, the mobile terminal may have a proximity sensor including an infrared emitter and an infrared receiver. The infrared emitter is configured to emit infrared light which is reflected by an external object and forms reflected light. The infrared receiver is configured to receive the reflected light, and then determine whether a distance between the mobile terminal and the external object becomes greater or less, according to the intensity of the reflected light.

Typically, the proximity sensor is disposed at the top of the front surface of the mobile terminal and is adjacent to a front camera. Hence, a through-hole should be made in the non-display area so as to receive the proximity sensor, which prevents the non-display area from being further reduced, in contrast to the pursuit of an increase in the proportion of the display area. Therefore, the proportion of the display area may be small.

BRIEF DESCRIPTION OF THE DRAWINGS

In order to more clearly describe technical solutions according to implementations of the present disclosure, accompanying drawings used for describing the implementations will be briefly introduced hereinafter. Apparently, the accompanying drawings described hereinafter merely illustrate some implementations of the present disclosure, and persons skilled in the art may also derive other accompanying drawings from these accompanying drawings without creative efforts.

DETAILED DESCRIPTION

Figure 1:
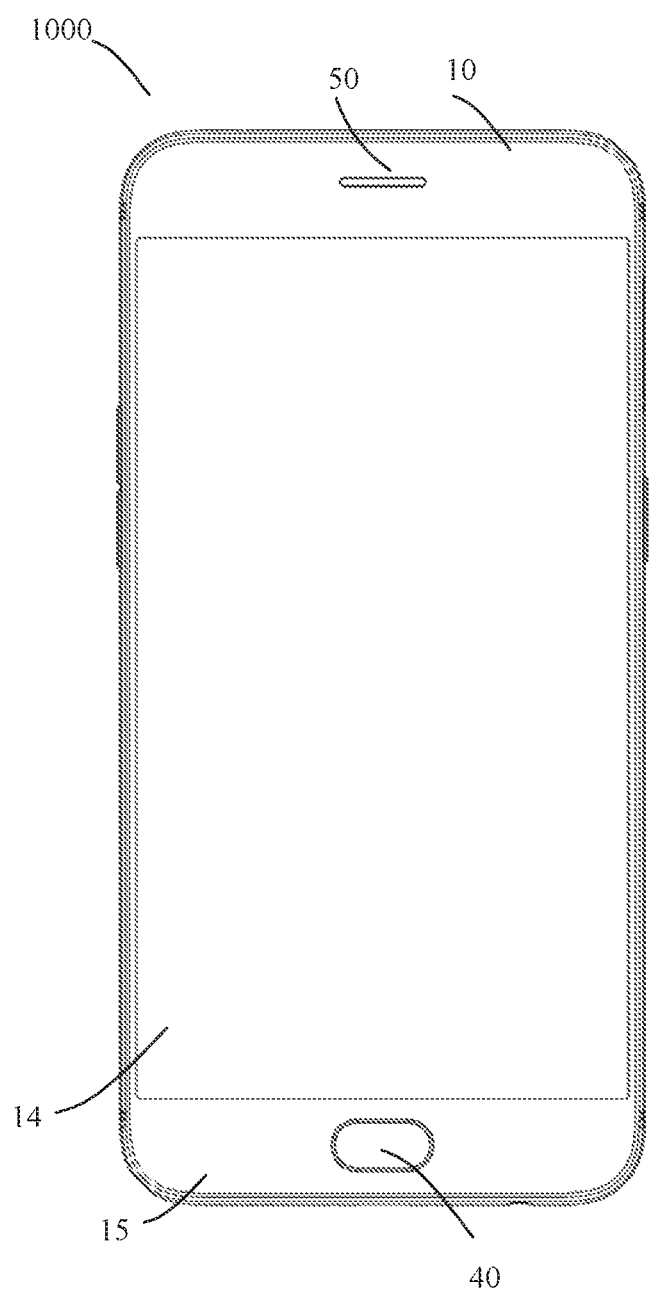
FIG. 1 is a schematic view of a structure of a terminal according to an implementation of the present disclosure.

A clear, complete description for technical solutions of implementations of the present disclosure is provided below, in conjunction with the drawings in the implementations of the present disclosure. Apparently, the implementations to be described are a part, rather than all of the implementations of the present disclosure. Other implementations obtained by persons skilled in the art from the implementations given herein without creative efforts should all fall within the protection scope of the present disclosure.

In the description of the present disclosure, it should be understood that orientational or positional relationships indicated by the terms "central", "longitudinal", "transverse", "length", "width", "thickness", "upper", "lower", "front", "back", "left", "right", "vertical", "horizontal", "top", "bottom", "inside", "outside", "clockwise", "counterclockwise", and the like are those as illustrated in the accompanying drawings, and are merely for facilitating and simplifying the description of the present disclosure, rather than indicating or implying that the mentioned devices or elements should have specific orientations and should be constructed and operated in specific orientations, and thus cannot be construed as a limit on the present disclosure.

In addition, the terms "first", "second" are merely for illustrative purposes, and cannot be construed as indicating or implying relative importance or implicitly indicating the quantity of mentioned technical features. Therefore, explicitly or implicitly, features defined by "first", "second" may be one or more. In the description of the present disclosure, the term "plural" means two or more, unless specified otherwise.

In the present disclosure, unless specified otherwise, the terms "mount", "connect", "couple", and the like should be broadly understood, and may refer to, for example, an undetachable connection, a detachable connection, or an integral connection, or may refer to a mechanical connection, an electrical connection, or mutual communication, or may refer to a direct connection, an indirect connection via an intermediate medium, or a communication between two elements or an interaction relationship between two elements. For persons skilled in the art, the specific meaning of the foregoing terms in the present disclosure should be understood in light of the specific circumstance.

In the present disclosure, unless specified otherwise, a first feature being "on" or "beneath" a second feature may mean that the first feature may be in direct contact with the second feature, or the first feature may be in indirect contact with the second feature via an intermediate medium. Moreover, the first feature being "on", "over" or "above" the second feature may mean that the first feature is over or above the second feature, or merely mean that the first feature has a horizontal level higher than the second feature. The first feature being "beneath", "under" or "below" the second feature may mean that the first feature is under or below the second feature, or merely mean that the first feature has a horizontal level lower than the second feature.

Many different implementations or examples for achieving different structures of the present disclosure are provided hereinafter. To simplify the present disclosure, the components and arrangements of specific examples are described below. These components and arrangements are merely exemplary, and are not to be construed as a limit on the present disclosure. In addition, the reference numerals and/or letters may be repeated in the different examples of the present disclosure. Such repetition is for the purpose of simplification and clarity, without indicating relationships between the discussed various implementations and/or arrangements. Moreover, the present disclosure provides examples of various specific processes and materials, but the application of other processes and/or use of other materials may also occur to persons skilled in the art.

Figure 3:
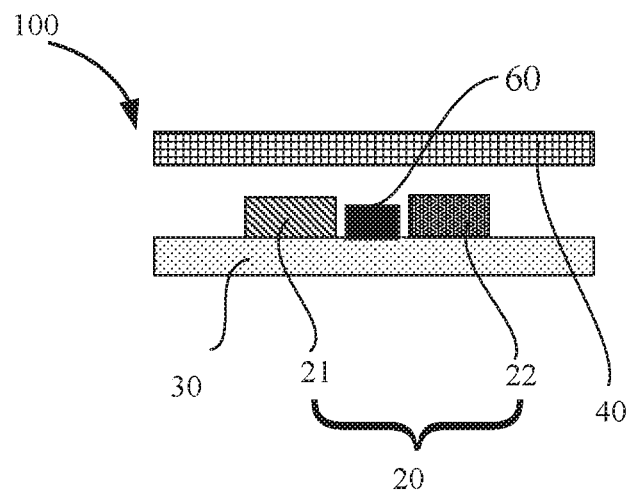
FIG. 3 is a schematic cross-sectional view of a first structure of a sensor assembly according to an implementation of the present disclosure.

FIG. 1 is a schematic view of a structure of a terminal according to an implementation of the present disclosure, and FIG. 3 is a schematic cross-sectional view of a first structure of a sensor assembly according to an implementation of the present disclosure. As illustrated in FIG. 1 and FIG. 3, a terminal 1000 includes a cover plate 10, an opening 50 for allowing sound from an earphone to be transmitted outside, and a sensor assembly 100 which includes a proximity sensor 20 and a fingerprint module including a fingerprint panel 40 and a fingerprint sensor 60. In at least one implementation, the sensor assembly 100 may further include a printed circuit board 30.

Figure 2:
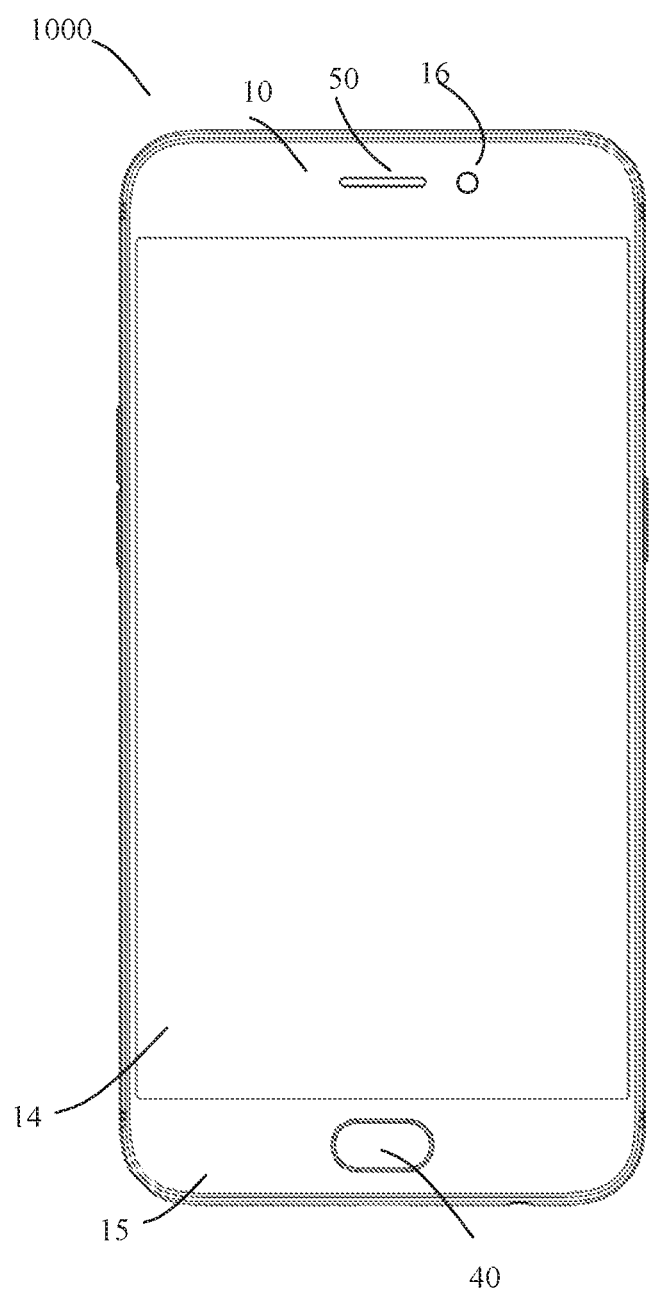
FIG. 2 is a schematic view of another structure of a terminal according to an implementation of the present disclosure.

FIG. 2 is a schematic view of another structure of a terminal according to an implementation of the present disclosure. In at least one implementation, as illustrated in FIG. 2, the terminal 1000 may further include a front camera 16.

The proximity sensor 20 is located below the fingerprint panel 40 and electrically connected to the printed circuit board 30. The proximity sensor 20 includes a light emitter 21 configured to emit light and a light receiver 22 configured to receive reflected light. The light emitted by the light emitter 21 exits through the fingerprint panel 40, and is then reflected by an external object to form the reflected light which is in turn received by the light receiver 22 through the fingerprint panel 40. In at least one implementation, the light emitter 21 may be an infrared emitter such as an infrared light-emitting diode (IR LED), while the light receiver 22 may be an infrared receiver.

As illustrated in FIG. 3, the light emitter 21 and the light receiver 22 are respectively disposed on two sides of the fingerprint sensor 60.

Figure 4:
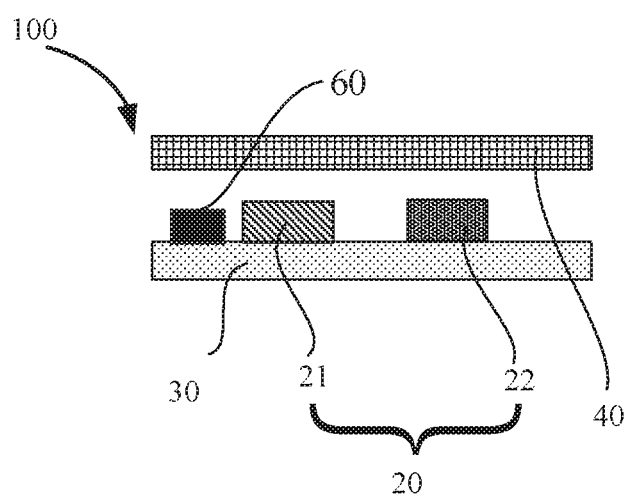
FIG. 4 is a schematic cross-sectional view of a second structure of a sensor assembly according to an implementation of the present disclosure.

FIG. 4 is a schematic cross-sectional view of a second structure of a sensor assembly according to an implementation of the present disclosure. In at least one implementation, as illustrated in FIG. 4, the light emitter 21 and the light receiver 22 may be disposed on the same side of the fingerprint sensor 60.

As illustrated in FIG. 3, the light emitter 21 and the light receiver 22 are opposite to the fingerprint panel 40. In at least one implementation, the light emitter 21 and the light receiver 22 may be offset with respect to the fingerprint panel 40.

Figure 5:
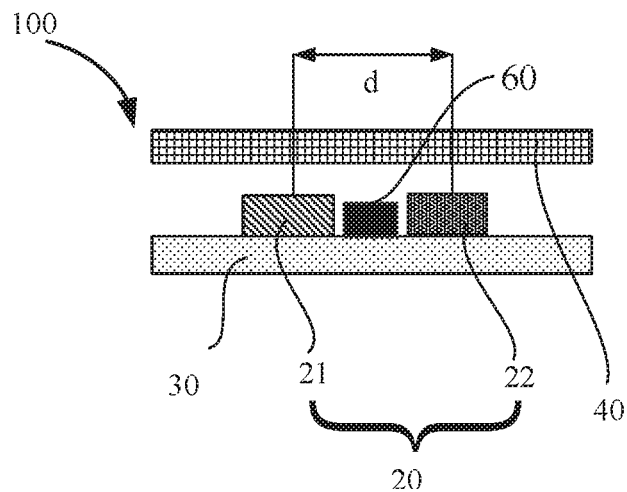
FIG. 5 is a schematic cross-sectional view of a third structure of a sensor assembly according to an implementation of the present disclosure.

A distance between the light emitter 21 and the light receiver 22 is in a range of 6 mm to 14 mm. FIG. 5 is a schematic cross-sectional view of a third structure of a sensor assembly according to an implementation of the present disclosure. In at least one implementation, as illustrated in FIG. 5, the distance between the light emitter 21 and the light receiver 22 is a distance between the geometric center of the light emitter 21 and the geometric center of the light receiver 22.

The terminal 1000 can determine whether a distance between the terminal 1000 and the external object becomes greater or less according to the intensity of the reflected light received by the light receiver 22, so as to perform one or more corresponding operations.

In at least one implementation, the proximity sensor 20 may determine whether the terminal 1000 is close to a user's face by detecting the light emitted by the light emitter 21 and reflected by the user's face, when the terminal 1000 performs communication. The backlight of the display screen may be turned off when the terminal 1000 is close to the user's face, thereby reducing power consumption and preventing misoperations.

In at least one implementation, the terminal 1000 may perform gesture recognition by means of a plurality of proximity sensors 20, and then perform one or more corresponding operations according to the recognition result.

The fingerprint sensor 60 is also located below the fingerprint panel 40 and electrically connected to the printed circuit board 30. The fingerprint sensor 60 is configured to acquire fingerprint data, together with the fingerprint panel 40.

The terminal 1000 in which the sensor assembly 100 is applicable may be, for example, a mobile phone, a tablet computer, or the like. It will be appreciated that the terminal 1000 is not limited to those mentioned in the present disclosure.

The cover plate 10 may be a touch panel, a display panel, a touch display panel, or any panel having other functions. The cover plate 10 has an upper surface opposite to the user. The user can perform gesture operations (such as tapping or swiping) on the upper surface of the cover plate 10, so as to achieve corresponding functions by operating the terminal 1000.

The cover plate 10 may be a transparent glass cover plate. In at least one implementation, the cover plate 10 may be made of transparent material such as sapphire.

The cover plate 10 includes a display area 14 and a non-display area 15. In at least one implementation, the display area 14 is the middle portion of the cover plate 10, while the non-display area 15 is disposed at the periphery of the display area 14. In at least one implementation, the non-display area 15 is disposed at the top or bottom of the display area 14. In at least one implementation, the front camera 16 may be disposed in the non-display area 15 disposed at the top of the display area 14.

Since the cover plate 10 is made of transparent material, the user can view a display screen of the terminal 1000 through the display area 14.

In order to improve the aesthetic appeal of the terminal 1000, the lower surface of the fingerprint panel 40 may be coated with ink which not only can meet users' demand for the terminal 1000 having different colors, but also can hide the proximity sensor 20 disposed under the fingerprint panel 40.

Figure 6:
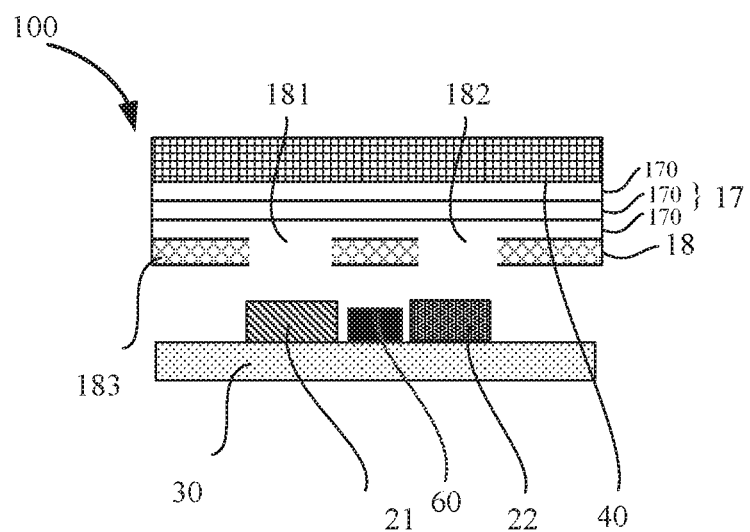
FIG. 6 is a schematic cross-sectional view of a fourth structure of a sensor assembly according to an implementation of the present disclosure.

FIG. 6 is a schematic cross-sectional view of a fourth structure of a sensor assembly according to an implementation of the present disclosure. As illustrated in FIG. 6, a first attached layer 17 made from ink is disposed on the lower surface of the fingerprint panel 40 close to the light emitter 21 and the light receiver 22. The first attached layer 17 includes at least one first attached sub-layer 170. A second attached layer 18 made from ink is disposed on the lower surface of the first attached layer 17 close to the light emitter 21 and the light receiver 22.

Figure 7:
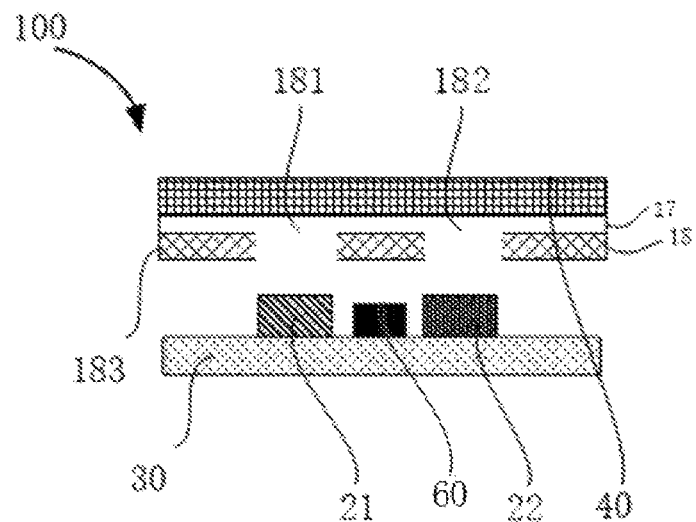
FIG. 7 is a schematic cross-sectional view of a fifth structure of a sensor assembly according to an implementation of the present disclosure.

In at least one implementation, the number of the first attached sub-layers 170 in the first attached layer 17 may be adjusted according to actual requirements, for example, the number of the first attached sub-layers 170 may be two, three, or four. In FIG. 6, the first attached layer 17 includes three first attached sub-layers 170. FIG. 7 is a schematic cross-sectional view of a fifth structure of a sensor assembly according to an implementation of the present disclosure. As illustrated in FIG. 7, the first attached layer 17 includes only one first attached sub-layer.

The first attached layer 17 and the second attached layer 18 can be formed by a spraying process, such as an electrostatic spraying process, a powder spraying process, or the like.

The first attached layer 17 may be a flat or uniform layer made from transparent ink, and may have a transmissivity greater than the second attached layer 18. In at least one implementation, the first attached layer 17 may have a transmissivity of 80% or more, while the second attached layer 18 may have a transmissivity of 10% or less. The first attached layer 17 serves as a transmissive layer used for transmitting most of the light, while the second attached layer 18 serves as a blocking layer used for blocking most of the light.

The second attached layer 18 can block external light outside the terminal 1000 or internal light inside the terminal 1000, so as to hide the internal structure of the terminal 1000, and improve the aesthetic appeal of the terminal 1000. In at least one implementation, the ink of the second attached layer 18 may have a black color, a grey color, or the like, as long as the transmissivity of the first attached layer 17 is greater than that of the second attached layer 18. The color of the second attached layer 18 may be adjusted according to actual requirements.

The first attached layer 17 can protect the second attached layer 18, prevent the second attached layer 18 from being damaged, and can also meet the users' demand for the terminal 1000 having different colors. In at least one implementation, the ink of the first attached layer 17 may have a white color, a blue color, or the like, as long as the transmissivity of the first attached layer 17 is greater than that of the second attached layer 18. The color of the first attached layer 17 may be adjusted according to actual requirements.

As illustrated in FIG. 6, the second attached layer 18 includes a first light-transmitting area 181, a second light-transmitting area 182, and a light-blocking area 183. The first light-transmitting area 181 allows the light emitted by the light emitter 21 to pass through. The second light-transmitting area 182 allows the reflected light received by the light receiver 22 to pass through. The light-blocking area 183 is configured to block the light. The first light-transmitting area 181 and the second light-transmitting area 182 are defined by the light-blocking area 183. The first attached layer 17 covers the first light-transmitting area 181 and the second light-transmitting area 182 such that the first light-transmitting area 181 and the second light-transmitting area 182 are hidden and becomes invisible.

The light emitter 21 is located below the first light-transmitting area 181 and is configured to emit the light through the first light-transmitting area 181. The light receiver 22 is located below the second light-transmitting area 182 and is configured to receive the light emitted by the light emitter 21 and reflected by the external object. In other words, the light emitter 21 is opposite to the first light-transmitting area 181 and the light receiver 22 is opposite to the second light-transmitting area 182.

Figure 8:
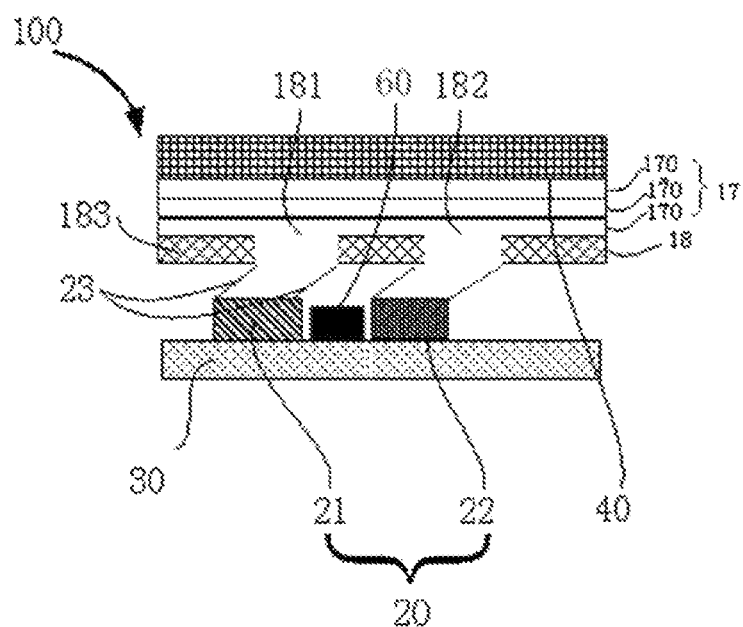
FIG. 8 is a schematic cross-sectional view of a sixth structure of a sensor assembly according to an implementation of the present disclosure.

FIG. 8 is a schematic cross-sectional view of a sixth structure of a sensor assembly according to an implementation of the present disclosure. As illustrated in FIG. 8, the light emitter 21 may be offset with respect to the first light-transmitting area 181 and the light receiver 22 may be offset with respect to the second light-transmitting area 182. In this case, in order to ensure that the light emitted by the light emitter 21 can pass through the first light-transmitting area 181 and the reflected light passing through the second light-transmitting area 182 can be received by the light receiver 22, a light-guiding structure 23 may be disposed between the second attached layer 18 and the proximity sensor 20 including the light emitter 21 and the light receiver 22. In at least one implementation, light reflecting plates extending upward may be disposed at the peripheries of the light emitter 21 and the light receiver 22, and the light reflecting plates may extend to the second attached layer 18, even to the lower surface of the cover plate 10.

In at least one implementation, since the light-guiding structure 23 can prevent the light from scattering, the light-guiding structure 23 may also be disposed between the second attached layer 18 and the proximity sensor 20 when the light emitter 21 is opposite to the first light-transmitting area 181 and the light receiver 22 is opposite to the second light-transmitting area 182.

In at least one implementation, the first light-transmitting area 181 and the second light-transmitting area 182 are two through-holes in the second attached layer 18. In this way, the light emitted by the light emitter 21 is transmitted through one through-hole, and is then reflected by the external object to form the reflected light which is in turn received by the light receiver 22 through the other through-hole.

The first light-transmitting area 181 and the second light-transmitting area 182 may be shaped according to actual requirements. In at least one implementation, the first light-transmitting area 181 may have a circular shape, a rectangular shape, a rectangular shape with rounded corners, or the like. In at least one implementation, the second light-transmitting area 182 may have a circular shape, a rectangular shape, a rectangular shape with rounded corners, or the like.

The first light-transmitting area 181 and the second light-transmitting area 182 may be sized according to actual requirements. In at least one implementation, the first light-transmitting area 181 may be a circular through-hole having a diameter of 1.1 to 1.3 mm, or 2 to 3 mm. In at least one implementation, the second light-transmitting area 182 may be a circular through-hole having a diameter of 1.1 to 1.3 mm, or 2 to 3 mm. In at least one implementation, the second light-transmitting area 182 may have a size larger than the first light-transmitting area 181, such that the capability of the light receiver 22 receiving the light is enhanced and the sensitivity of the proximity sensor 20 is improved.

Since only the second attached layer 18 is perforated and the first attached layer 17 is not perforated, the appearance of the terminal 1000 is not affected by perforation of the cover plate 10 or the fingerprint panel 40. Hence, the shapes and the sizes of the first light-transmitting area 181 and the second light-transmitting area 182 are not limited, and can be adjusted (in general, the larger, the better) according to the actual requirements of the proximity sensor 20 emitting and receiving the light, thereby improving the perforating flexibility and the performance of the proximity sensor 20.

Figure 9:
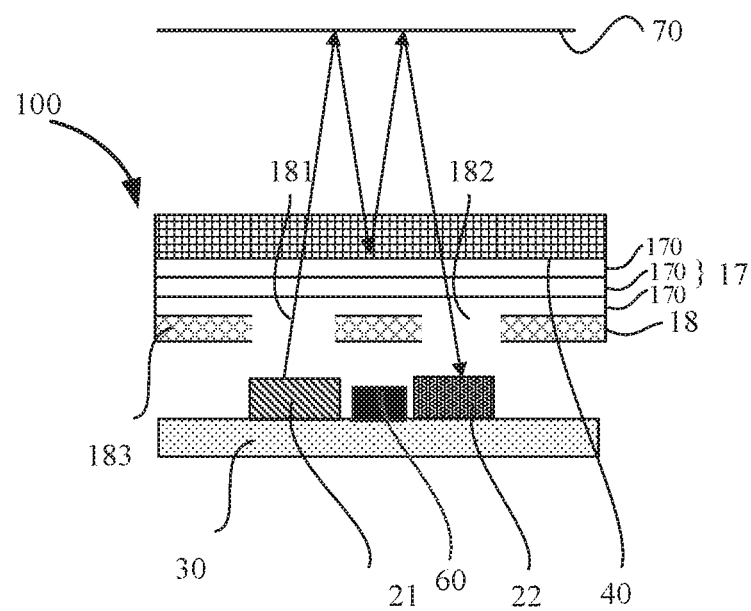
FIG. 9 is a schematic diagram of a sensor assembly sensing light according to an implementation of the present disclosure.

FIG. 9 is a schematic diagram of a sensor assembly sensing light according to an implementation of the present disclosure. As illustrated in FIG. 9, the light emitter 21 emits the light. A part of the light passes through the first light-transmitting area 181, the first attached layer 17, and the fingerprint panel 40. The part of the light is then reflected to the fingerprint panel 40 by an external object 70, and is reflected to the external object 70 by the fingerprint panel 40. The part of the light is further reflected by the external object 70 and forms the reflected light which is in turn received by the light receiver 22 through the fingerprint panel 40, the first attached layer 17, and second light-transmitting area 182. Another part of the light is scattered inside the terminal 1000 (for example, it is reflected by the second attached layer 18 and the fingerprint panel 40 inside the terminal 1000 for a plurality of times) after the light is emitted by the light emitter 21, and finally received by the light receiver 22.

In order to improve the sensing accuracy and performance of the proximity sensor 20, the distance between the light emitter 21 and the light receiver 22 can be increased. In at least one implementation, the distance between the light emitter 21 and the light receiver 22 may be increased as far as possible, when the distance is in a range of 6 mm to 14 mm. Accordingly, the distance between the first light-transmitting area 181 and the second light-transmitting area 182 may also be in a range of 6 mm to 14 mm. The distance between the first light-transmitting area 181 and the second light-transmitting area 182 may be a center distance, i.e., a distance between the geometric center of the first light-transmitting area 181 and the geometric center of the second light-transmitting area 182.

In order to further improve the sensing accuracy and performance of the proximity sensor 20, the light receiver 22 may have a larger measuring range, i.e., a larger proximity value range, in addition to the increase in the distance between the light emitter 21 and the light receiver 22.

In order to facilitate assembling, the proximity sensor 20 including the light emitter 21 and the light receiver 22 can be manufactured individually, and then be fitted together with the fingerprint panel 40.

Figure 10:
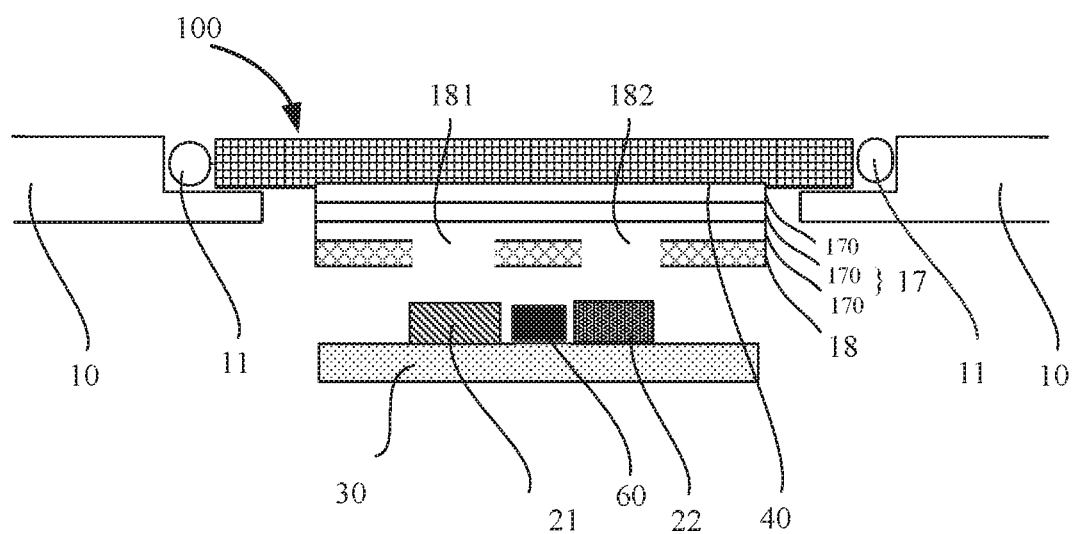
FIG. 10 is a schematic cross-sectional view of yet another structure of a terminal according to an implementation of the present disclosure.

FIG. 10 is a schematic cross-sectional view of yet another structure of a terminal according to an implementation of the present disclosure. As illustrated in FIG. 10, a groove used to receive the fingerprint panel 40 is defined in the cover plate 10, and the proximity sensor 20 and the fingerprint sensor 60 are located below the fingerprint panel 40.

In at least one implementation, the terminal 1000 may further include a decorative component 11 which is disposed between an outer peripheral surface of the fingerprint panel 40 and an inner peripheral surface of the groove, thereby improving the aesthetic appeal of the terminal 1000. In at least one implementation, the decorative component 11 has an annular shape and surrounds the fingerprint panel 40, thereby further improving the aesthetic appeal of the terminal 1000. In at least one implementation, the decorative component 11 may be made of metal having gloss which improves the aesthetic appeal of the terminal 1000. In at least one implementation, the fingerprint panel 40 may have a circular shape, an ellipse shape, a rectangular shape, or the like.

The terminal 1000 may further include a housing in which the sensor assembly 100 is disposed.

According to the present disclosure, the proximity sensor is disposed in the sensor assembly, i.e., the light emitter and the light receiver are disposed below the fingerprint panel, and thus, the cover plate may not be perforated for receiving the proximity sensor, thereby effectively increasing the proportion of the display area such that the display area becomes larger.

Although the present disclosure has been illustrated and described with respect to a certain implementation or implementations, certain equivalent alterations and modifications will occur to persons skilled in the art upon the reading and understanding of this description and the accompanying drawings. The present disclosure includes all such alterations and modifications, and is limited only by the scope of the appended claims. In particular regard to the various functions performed by the above described components, the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the present disclosure. In addition, while a particular feature of the present disclosure may have been disclosed with respect to only one of several implementations, such feature may be combined with one or more features of the other implementations as may be desired and advantageous for any given or particular application.

Furthermore, to the extent that the terms "including", "includes", "having", "has", "with", or variants thereof are used in the description or the claims, such terms are intended to be inclusive in a manner similar to the term "comprising".

The sensor module and the terminal according to implementations of the present disclosure are described in detail hereinbefore. The principles and implementations of the present disclosure are set forth by way of specific examples herein. The description of the above-mentioned implementations is merely for assisting in understanding the methods and spirits of the present disclosure. Meanwhile, based on the spirits of the present disclosure, persons skilled in the art can make modifications to the implementations and application scope. In conclusion, the content of the present disclosure should not be considered as a limitation on the present disclosure.

What is claimed is:
1. A sensor assembly, comprising:
a fingerprint module, comprising a fingerprint panel and a fingerprint sensor located below the fingerprint panel;
a proximity sensor, located below the fingerprint panel and comprising a light emitter and a light receiver, wherein the light emitter is operable to emit light that exits through the fingerprint panel and is reflected by an external object to form reflected light, and the light receiver is operable to receive the reflected light;
a first attached layer disposed on a surface of the fingerprint panel close to the light emitter and the light receiver;
a second attached layer disposed on the first attached layer, and defining a first through hole and a second through hole;

the light emitter being offset with respect to and partially facing the first through hole, and the light receiver being offset with respect to and partially facing the second through hole;

a first light-guiding structure disposed between the second attached layer and the light emitter, wherein the first light-guiding structure comprises two parallel first light-guiding portions, wherein each of the first light-guiding portions is obliquely oriented relative to a top edge of the light emitter and extends from the top edge of the light emitter to an edge of the first through hole; and a second light-guiding structure disposed between the second attached layer and the light receiver, wherein the second light-guiding structure comprises two parallel second light-guiding portions, wherein each of the second light-guiding portions is obliquely oriented relative to a top edge of the light receiver and extends from the top edge of the light receiver to an edge of the second through hole whereby the first light guiding portions are parallel to the second light guiding portions.

2. The sensor assembly of claim 1, wherein the light emitter and the light receiver are respectively disposed on two sides of the fingerprint sensor.

3. The sensor assembly of claim 1, wherein:
the first through hole allows the light emitted by the light emitter to pass through and the second through hole allows the reflected light to be received by the light receiver to pass through, and
the first attached layer covers the first through hole and the second through hole.

4. The sensor assembly of claim 3, wherein the first attached layer comprises at least one first attached sub-layer.

5. The sensor assembly of claim 3, wherein the first attached layer has a greater transmissivity than the second attached layer.

6. The sensor assembly of claim 3, wherein the second through hole has a larger size than the first through hole.

7. The sensor assembly of claim 1, wherein a distance between the light emitter and the light receiver is in a range of 6 mm to 14 mm.

8. The sensor assembly of claim 7, wherein the distance between the light emitter and the light receiver is a distance between a geometric center of the light emitter and a geometric center of the light receiver.

9. The sensor assembly of claim 1, wherein when a terminal comprising the sensor assembly performs communication, and the light emitted by the light emitter is reflected by the external object and the reflected light is received by the light receiver, a backlight of a display screen of the terminal is turned off.

10. A terminal, comprising a housing and a sensor assembly disposed in the housing, wherein the sensor assembly comprises:
a fingerprint module, comprising a fingerprint panel and a fingerprint sensor located below the fingerprint panel;
a proximity sensor, located below the fingerprint panel and comprising a light emitter and a light receiver, wherein the light emitter is operable to emit light that exits through the fingerprint panel and is reflected by an external object to form reflected light, and the light receiver is operable to receive the reflected light;
a first attached layer disposed on a surface of the fingerprint panel close to the light emitter and the light receiver;

a second attached layer disposed on the first attached layer, and defining a first through hole and a second through hole;

the light emitter being offset with respect to and partially facing the first through hole, and the light receiver being offset with respect to and partially facing the second through hole;

a first light-guiding structure disposed between the second attached layer and the light emitter, wherein the first light-guiding structure comprises two parallel first light-guiding portions, wherein each of the first light-guiding portions is obliquely oriented relative to a top edge of the light emitter and extends from the top edge of the light emitter to an edge of the first through hole; and a second light-guiding structure disposed between the second attached layer and the light receiver, wherein the second light-guiding structure comprises two parallel second light-guiding portions, wherein each of the second light-guiding portions is obliquely oriented relative to a top edge of the light receiver and extends from the top edge of the light receiver to an edge of the second through hole whereby the first light guiding portions are parallel to the second light guiding portions.

11. The terminal of claim 10, wherein the terminal further comprises a cover plate, a groove is defined in the cover plate, and the fingerprint panel is received in the groove.

12. The terminal of claim 11, wherein the terminal further comprises a decorative component disposed between an outer peripheral surface of the fingerprint panel and an inner peripheral surface of the groove.

13. The terminal of claim 10, wherein when the terminal performs communication, and the light emitted by the light emitter is reflected by the external object and the reflected light is received by the light receiver, a backlight of a display screen of the terminal is turned off.

14. A sensor assembly, comprising:
a fingerprint panel;
a fingerprint sensor, a light emitter, and a light receiver, wherein the finger print sensor, the light emitter, and the light receiver are disposed below the fingerprint panel, and wherein the light emitter is operable to emit light that exits through the fingerprint panel and is reflected by an external object to form reflected light, and the light receiver is operable to receive the reflected light;
a first attached layer disposed on a surface of the fingerprint panel close to the light emitter and the light receiver;
a second attached layer disposed on the first attached layer, and defining a first through hole and a second through hole;
the light emitter being offset with respect to the first through hole and having a part facing the first through hole and another part covered by part of the second attached layer that is adjacent to a side of the first through hole, and the light receiver being offset with respect to the second through hole and having a part facing the second through hole and another part covered by another part of the second attached layer that locates between the first through hole and the second through hole;
a first light-guiding structure disposed between the second attached layer and the light emitter, wherein the first light-guiding structure comprises two parallel first light-guiding portions, wherein each of the first light-guiding portions is obliquely oriented relative to a top edge of the light emitter and extends from the top edge of the light emitter to an edge of the first through hole; and a second light-guiding structure disposed between the second attached layer and the light receiver, wherein the second light-guiding structure comprises two parallel second light-guiding portions, wherein each of the second light-guiding portions is obliquely oriented relative to a top edge of the light receiver and extends from the top edge of the light receiver to an edge of the second through hole whereby the first light guiding portions are parallel to the second light guiding portions.

15. The sensor assembly of claim 14, wherein the second through hole has a larger size than the first through hole.

16. The sensor assembly of claim 14, wherein a distance between the light emitter and the light receiver is in a range of 6 mm to 14 mm.

17. The sensor assembly of claim 16, wherein the distance between the light emitter and the light receiver is a distance between a geometric center of the light emitter and a geometric center of the light receiver.

18. The sensor assembly of claim 14, wherein when a terminal comprising the sensor assembly performs communication, and the light emitted by the light emitter is reflected by the external object and the reflected light is received by the light receiver, a backlight of a display screen of the terminal is turned off.

\* \* \* \* \*